United States Patent
Alahyari et al.

(10) Patent No.: US 11,705,782 B2
(45) Date of Patent: Jul. 18, 2023

(54) ELECTRIC MOTOR COOLING WITH OSCILLATING HEAT PIPES

(71) Applicant: Hamilton Sundstrand Corporation, Charlotte, NC (US)

(72) Inventors: Abbas A. Alahyari, Glastonbury, CT (US); Kimberly Rae Saviers, Glastonbury, CT (US); Jagadeesh Kumar Tangudu, South Windsor, CT (US); Joseph Turney, Amston, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/482,737

(22) Filed: Sep. 23, 2021

(65) Prior Publication Data
US 2023/0090559 A1 Mar. 23, 2023

(51) Int. Cl.
*H02K 9/20* (2006.01)
*H02K 9/22* (2006.01)
*H02K 3/12* (2006.01)
*H02K 1/20* (2006.01)
*H02K 3/34* (2006.01)
(Continued)

(52) U.S. Cl.
CPC ............... *H02K 9/20* (2013.01); *H02K 1/20* (2013.01); *H02K 3/12* (2013.01); *H02K 3/24* (2013.01); *H02K 3/34* (2013.01); *H02K 3/48* (2013.01); *H02K 9/225* (2021.01)

(58) Field of Classification Search
CPC .. H02K 1/20; H02K 3/12; H02K 3/24; H02K 3/34; H02K 3/48; H02K 9/19; H02K 9/20; H02K 9/225

USPC .......................................... 310/52, 54, 58, 64
See application file for complete search history.

(56) References Cited

U.S. PATENT DOCUMENTS

| 3,801,843 A | 4/1974 | Corman et al. |
| 11,059,599 B2* | 7/2021 | Rabbi ................... B64D 27/24 |
| 11,122,715 B2* | 9/2021 | Bodla .................... F28D 15/04 |

(Continued)

FOREIGN PATENT DOCUMENTS

| CN | 107747750 A | 3/2018 |
| CN | 110793375 A | 2/2020 |

(Continued)

OTHER PUBLICATIONS

Abstract of CN 107747750A, 2 pages.
(Continued)

*Primary Examiner* — Rashad H Johnson
(74) *Attorney, Agent, or Firm* — Cantor Colburn LLP

(57) ABSTRACT

A stator and a motor including a stator. The stator includes a stator hub, a plurality of stator teeth extending from the stator hub that define a stator slot having a stator slot base, at least one winding disposed in the stator slot, and one or more oscillating heat pipes disposed at least partially in the at least one winding. The at least one winding is held apart from the stator slot base so that a cooling channel is defined between an inner winding portion of the at least one winding and a portion of the one or more oscillating heat pipes is disposed in the channel so cooling fluid can be passed between the stator slot base and the inner winding portion to cool the inner winding portion via at least operation of the one or more oscillating heat pipes.

17 Claims, 5 Drawing Sheets

(51) Int. Cl.
*H02K 3/48* (2006.01)
*H02K 3/24* (2006.01)

(56) References Cited

U.S. PATENT DOCUMENTS

| | | | |
|---|---|---|---|
| 11,303,194 B1* | 4/2022 | Jansen | H02K 13/003 |
| 2008/0012436 A1* | 1/2008 | Neal | H02K 9/225 |
| | | | 310/90 |
| 2008/0017354 A1* | 1/2008 | Neal | H01F 27/10 |
| | | | 310/43 |
| 2008/0018180 A1* | 1/2008 | Neal | H02K 9/225 |
| | | | 310/43 |
| 2008/0018181 A1* | 1/2008 | Neal | H02K 9/225 |
| | | | 310/43 |
| 2008/0029506 A1* | 2/2008 | Neal | H05B 6/108 |
| | | | 219/628 |
| 2008/0197724 A1 | 8/2008 | Cullen et al. | |
| 2014/0139058 A1* | 5/2014 | Wei | H02K 5/203 |
| | | | 310/59 |
| 2015/0091398 A1* | 4/2015 | Bradfield | H02K 3/24 |
| | | | 29/596 |
| 2017/0141654 A1* | 5/2017 | Bodla | H02K 9/225 |
| 2017/0141655 A1* | 5/2017 | Bodla | H02K 9/223 |
| 2018/0205302 A1* | 7/2018 | Gieras | H02K 3/325 |
| 2020/0227955 A1* | 7/2020 | Fatemi | H02K 3/12 |
| 2020/0303974 A1* | 9/2020 | Ishikawa | H02K 3/02 |
| 2020/0336045 A1 | 10/2020 | Bodla et al. | |
| 2022/0286005 A1* | 9/2022 | Ueda | H02K 3/345 |

FOREIGN PATENT DOCUMENTS

| | | |
|---|---|---|
| CN | 212343443 U | 1/2021 |
| DE | 102018102750 A1 | 8/2019 |
| WO | 2019154731 A1 | 8/2019 |
| WO | 2020227837 A1 | 11/2020 |

OTHER PUBLICATIONS

Abstract of CN 110793375A, 2 pages.
European Search Report for Application No. 22183672.9, dated Dec. 20, 2022, 6 pages.
Machine Translation for CN212343443 (U), Published: Jan. 12, 2021, 13 pages.

* cited by examiner

ELECTRIC MOTOR COOLING WITH OSCILLATING HEAT PIPES

STATEMENT OF FEDERAL SUPPORT

This invention was made with government support under DE-AR0001351 awarded by DOE. The government has certain rights in the invention.

BACKGROUND OF THE INVENTION

The subject matter disclosed herein relates to electrical machines. More specifically, the subject matter disclosed herein relates to cooling an electric motor with oscillating heat pipes.

A typical liquid cooled electric machines/motors includes a rotor having a core and one or more rotor windings (conductors) extending therethrough. In some machines, permanent magnet machines, the rotor windings are replaced with a plurality of permanent magnets. The rotor is surrounded by a stator and an air gap exists between the rotor and stator.

Similarly, the stator includes a stator core having one or more stator windings extending therethrough. High power density electric machines (either generator or motor) produce intense resistive heating of both the stator and rotor windings and eddy current and magnetic hysteresis heating of the rotor and stator cores.

Typical methods of stator cooling include utilizing an end-turn spray and thermal conduction through the back iron to a cooled housing or fluid media.

For example, traditional motor thermal management is often in the form of external fins or liquid cooling jackets. Such systems typically direct cooling liquid through one or more channels in the back iron (housing) radially outboard of the stator core. These cooling methods, however, provide cooling only on the radial and axial periphery of the stator core. Therefore, a hot spot in the stator windings can occur at the axial centerline of the stator core.

Another approach is to nn-slot cooling to directly cool electric motor windings, leading to lower temperatures, and ultimately higher power density motors. However, poor bulk thermal conductivities and interfacial resistances can result in high overall thermal resistance that need to be mitigated for effective cooling.

BRIEF DESCRIPTION OF THE INVENTION

Disclosed is a stator that includes a stator hub, a plurality of stator teeth extending from the stator hub that define a stator slot having a stator slot base, at least one winding disposed in the stator slot, and one or more oscillating heat pipes disposed at least partially in the at least one winding. The at least one winding is held apart from the stator slot base so that a cooling channel is defined between an inner winding portion of the at least one winding and a portion of the one or more oscillating heat pipes is disposed in the channel so cooling fluid can be passed between the stator slot base and the inner winding portion to cool the inner winding portion via at least operation of the one or more oscillating heat pipes.

In addition to one or more of the features described above, or as an alternative to any of the foregoing embodiments, the winding can be encased in a potting material.

In addition to one or more of the features described above, or as an alternative to any of the foregoing embodiments, the winding is formed of Litz wire.

In addition to one or more of the features described above, or as an alternative to any of the foregoing embodiments, insulators disposed between adjacent inner winding portions can also be provided.

In addition to one or more of the features described above, or as an alternative to any of the foregoing embodiments, the at least one winding can include 3, 5 or 3n windings where n is a whole number.

In addition to one or more of the features described above, or as an alternative to any of the foregoing embodiments, the stator can be in combination with an inlet header and outlet header that collectively provide fluid through the channel.

In addition to one or more of the features described above, or as an alternative to any of the foregoing embodiments, the one or more oscillating heat pipes can include an evaporator section and a condenser section and wherein the evaporator section is disposed in the at least one winding and the condenser section is disposed in the cooling channel. The evaporator and condenser sections can be connected by along a longitudinal axis of the one or oscillating heat pipes.

In addition to one or more of the features described above, or as an alternative to any of the foregoing embodiments, the stator can be subject to a low frequency vibration in the range of 0.5-4000 Hz.

In addition to one or more of the features described above, or as an alternative to any of the foregoing embodiments, the longitudinal axis of the one or more oscillating heat pipes is aligned with a primary direction of vibration of the stator.

Also disclosed is motor that includes a rotor and any stator as previously described.

In any motor disclosed herein, the stator is subject to a low frequency vibration in the range of 0.5-4000 Hz while the motor is operating.

In any motor disclosed herein, a longitudinal axis of the one or more oscillating heat pipes is aligned with a primary direction of vibration of the stator.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As motors have become more compact alternative methods of cooling the certain portions thereof may be beneficial. One particular place where heat can be generated is in the stator windings. Disclosed herein are ways to cool such windings with the use of oscillating heat pipes. The heat pipes can have an evaporator section that is in close proximity to a source of heat (e.g., the windings) and a condenser section that is located in a cooler section. Herein, the cooler section is shown as a slot in a stator (that can be fluid or air cooled) but that is not to limit the scope unless specifically noted.

In one embodiment, the evaporator section is disposed at least partially within the winding. In cases where is a flow channel is provided, it can be provided in a stator core. In that core there is provided a flow channel that provides a cooling region and is thermal contact with the condenser section.

Figure 1:
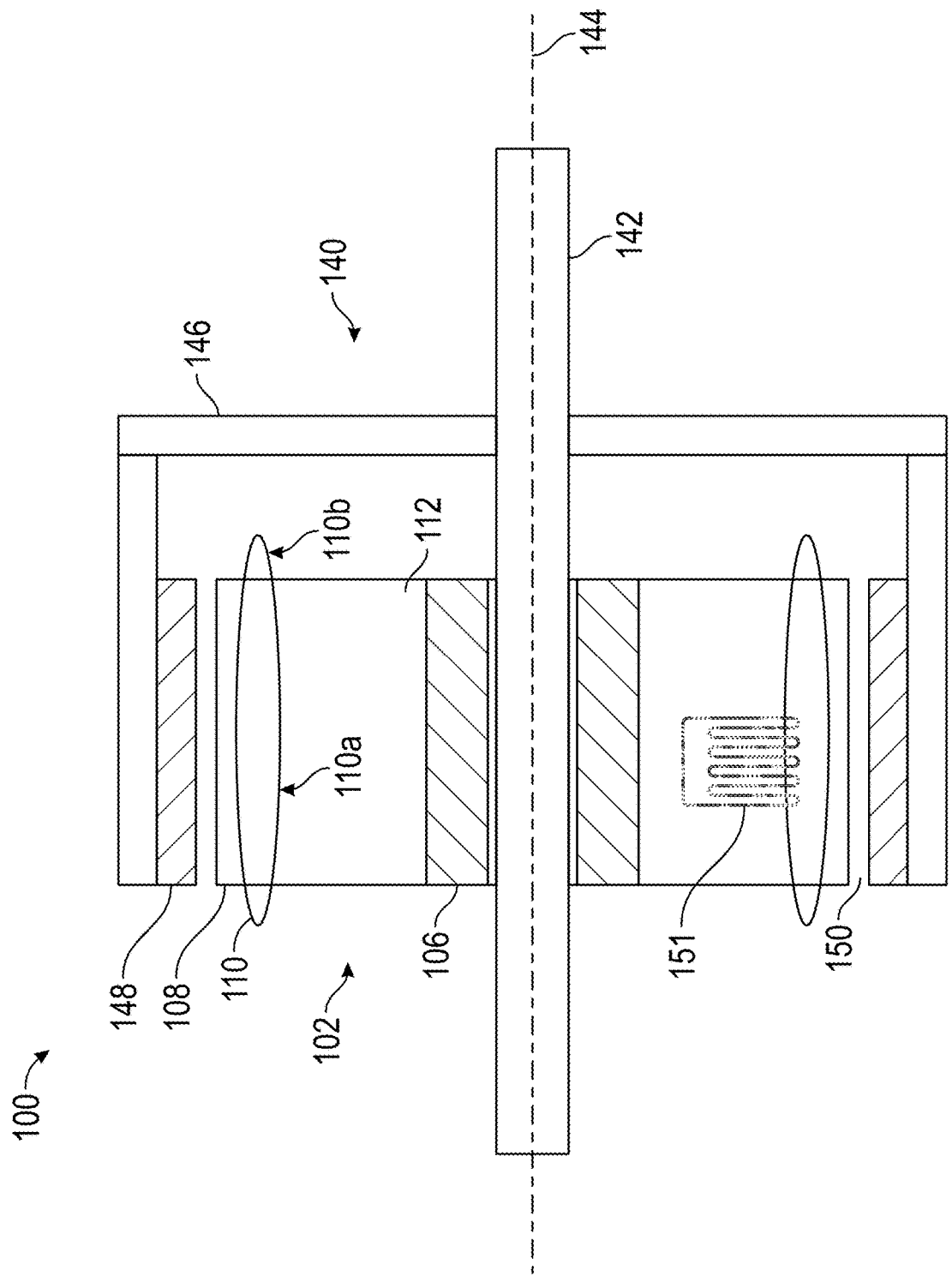
FIG. 1 is a cross-sectional view of an embodiment of an electric machine showing a rotor and a partial view of a stator.

FIG. 1 shows a schematic illustration of a cross section of an electric motor 100 that may incorporate embodiments of the present disclosure are shown. While shown as having rotor magnets external to or outside of the stator, the orientation could be reversed. Further, the teachings herein could be applied to a context where the magnets are u-shaped and surround both inner and outer portions of the stator.

Figure 2:
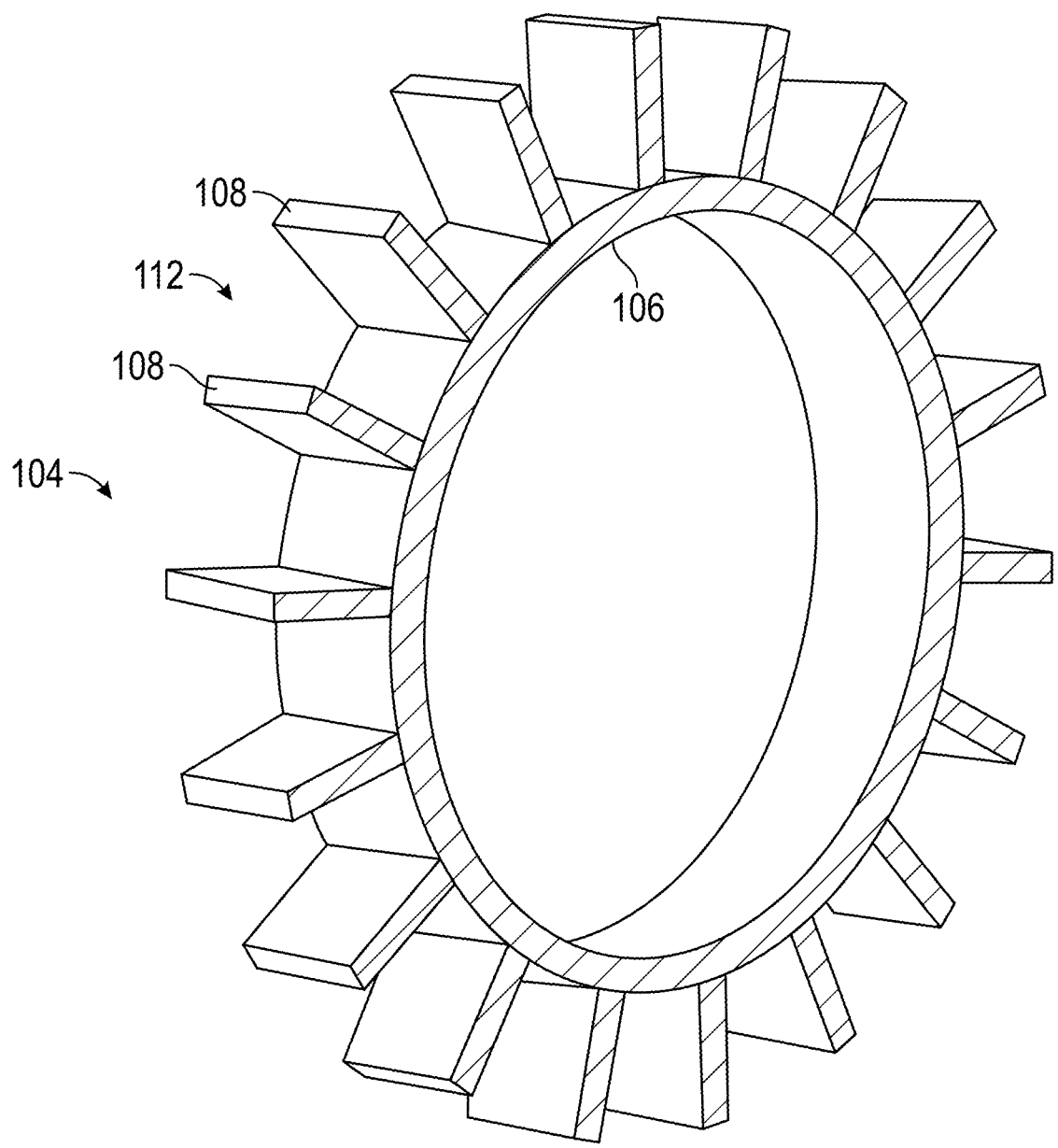
FIG. 2 is a perspective view of an embodiment of a stator for an electric machine.

In more detail, FIGS. 1 and 2 which, respectively, illustrates a cross-sectional view of the electric motor 100 and a perspective view of a simplified stator core 104. The electric motor 100 includes a stator 102 configured to surround but not rotate with a rotor shaft 142.

The stator 102 include a stator core 104 and one or more stator windings 110 supported or otherwise carried by the core 104. The windings can be formed as individual potted Litz wire windings in one embodiment. The stator core 104 includes ring hub 106 and a plurality of teeth 108 that extend outwardly from the ring hub 106. The adjacent teeth 108 form a stator slot 112 into which one or more stator windings may be disposed. That is, each slot can have a single stator winding 110 disposed therein or it can include two or more windings as shown in further examples below. In one or more embodiments, the windings 110 can a have an oscillating heat pipe 151 disposed therein.

The motor 100 also includes a rotor 140. The rotor shown in FIG. 1 includes a rotor shaft 142 that rotates about a rotation axis 144. The rotor 140 also includes a magnet carrying structure 146 connected to the shaft 142. The structure 146 carries one or more permanent magnets 148.

As shown, the stator 102 (and the windings 110 carried by the stator 102) is located radially inboard of the rotor magnets 148 relative to the rotation axis 144, with a radial air gap 150 located between the rotor 140 and the stator 104. As illustrated, the rotor 140 is mounted on a shaft 110 by the structure 146. When in a "motor" mode where current is applied into the windings 110 that current will interact with the magnets 148 and cause the magnets/structure to rotate so as cause rotation of the rotor shaft 142 about axis 144 so that the shaft 142 can provide motive force to a load. Alternatively, in a "generator" mode, the shaft 142 can be driven such that interaction of the magnets cause a current to flow in the windings 110 to drive an electrical load.

The stator core 104 can be formed from a plurality of axially stacked laminations, which are stacked along the rotation axis 144. In some embodiments, the laminations 116 are formed from a steel material, but one skilled in the art will readily appreciate that other materials may be utilized. In an alternative embodiment, the stator 104 can be formed as individual stator sections as is known in the art.

The stator windings 110, as shown, include core segments 110a extending through the stator core 104 and end turn segments 110b extending from each axial stator end of the stator core 104. As discussed above, when the stator windings 110 are energized via an electrical current therethrough, the resulting field drives rotation of the rotor 140 about the rotation axis 144.

Electric motors, as shown in FIGS. 1-2, may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

Herein, oscillating heat pipes in various parts of the motor are disclosed. Such heat pipes 151 can be used alone or in combination with channels in the stator (as well as a header that delivers coolant into those channels) to cool the motor and, in particular, the motor coils 110. In one embodiment, the channel is formed between the core and windings on an inner diameter of the windings.

Figure 3:
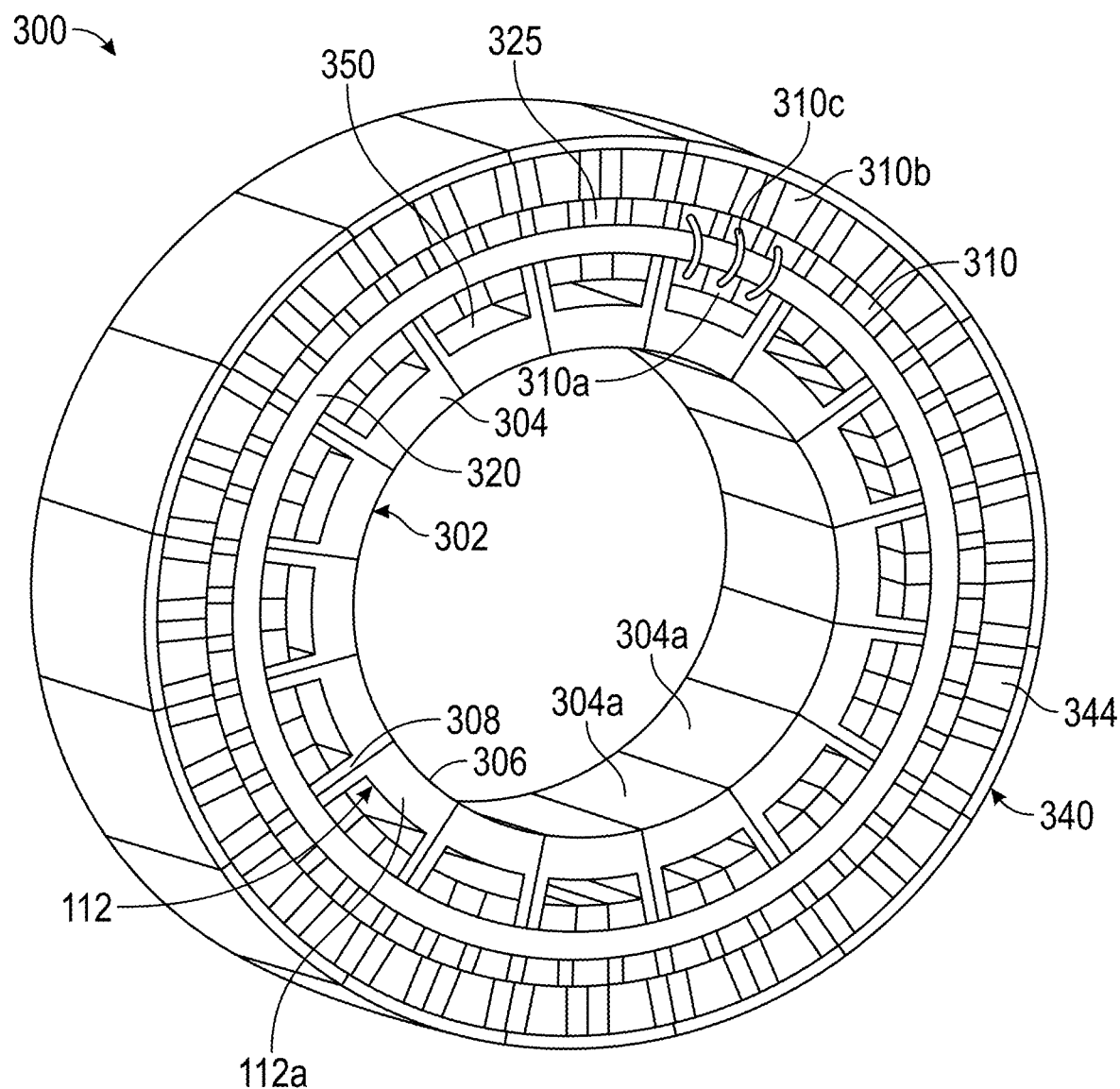
FIG. 3 shows a perspective of a portion of a motor according to one embodiment.

FIG. 3 shows a perspective view of a stator/rotor combination. The combination shown in FIG. 3 is applicable to all embodiments and can be arranged proximate headers to provide coolant into and out of it.

For brevity, the combination shown in FIG. 3 will be referred to motor 300. The motor 1000 includes a stator 302. The stator is formed of a stator core 304 and one or more stator windings 310 supported or otherwise carried by the core 304. As illustrated, the core 304 is formed of separate stator segments 304a that, when combined formed ring hub 306. The hub 306 includes a plurality of teeth 308 that extend outwardly from the ring hub 306.

The motor 300 includes a plurality of windings 310. The windings 310 can include "inner" windings 310a and "outer" windings 310b that are joined by end turns 310c around a stator back iron 320 in one embodiment. Of course, other configurations can be possible. In one embodiment, the windings can be formed as individual potted Litz wire windings. The windings 310 can be formed as individual windings that form a loop as shown in FIG. 4 in one embodiment.

Figure 4:
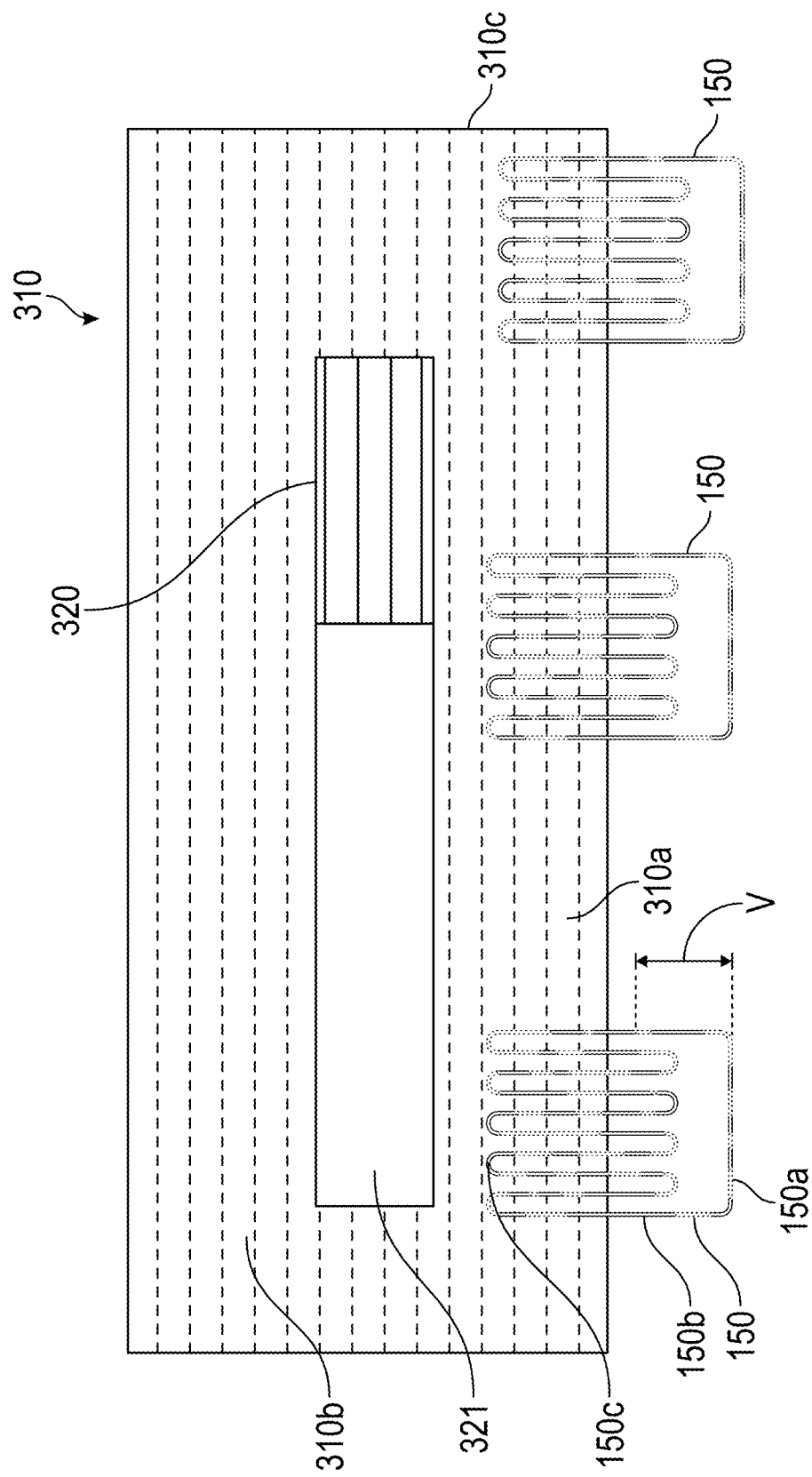
FIG. 4 shows a side-view of an example winding arranged to surround a back iron of the stator and that includes an OHP disposed therein.

FIG. 4 shows a side view of a winding 310 arranged such that surrounds the back iron 320. The end turn 310c goes around the back iron. The wires that form the winding 310 can be arranged so that they form discreet loop shaped units and a segmented back iron can be provide to thread into the inner portion 321 of the loops. Or course, distributed windings could also be utilized with the teachings herein. The winding 310 includes one or more oscillating heat pipes (OHP) 150 disposed therein.

The OPH 150 as shown is a closed loop OHP that includes a condenser section 150a, an adiabatic (or no heat transfer zone) section 150b and an evaporator section 150c. The closed loop OHP includes a working fluid disposed therein that partially fills the OHP 150. Heat that is present near the evaporator section 150c is transferred to the working fluid to create vapor regions (or slugs). The fluid and vapor then flows towards the condenser section 150 where the heat is removed and the vapor condenses and the slugs collapse. This collapse causes the circulation in the OHP 150. Further, it has been discovered that in context of a motor, when vibration is introduced, this process can work more efficiently when the vibration is in the direction (see direction V) to/from the evaporator section 150c to the condenser section 150a. As shown, direction V is also in the longitudinal direction (or along the longitudinal axis) of the OHP.

The vibration can have a frequency that is either a constant or in a range based on the typically operating speed of the motor. This frequency can used so that the diameter of the pipe forming the OHP 150 can the correctly sized and the working fluid selected based on a desired Bond number. Embodiments herein have been discovered to be especially effective with low frequency vibration in the range of 0.5-4000 Hz. In one embodiment, the primary direction of vibration is along direction V shown in FIG. 4. That is, in one embodiment, the embedded OHPs' longitudinal axis (V) is aligned with the primary direction of vibration of the motor (in this case, the radial direction).

Referring again to FIG. 3, the motor 300 also includes a rotor 340. While not shown, it is understood that the rotor shown in FIG. 3 includes a rotor shaft that rotates about a rotation axis. The rotor 340 carries one or more permanent magnets 344. The motor 300 works as described above. It shall be understood that FIG. 3 is provided as an example of a particular motor configuration and is not limiting. That is, the OHP as described herein can be applied for use in any electric machine that has coils.

As configured, the stator core 304 includes the ring hub 306 and a plurality of teeth 308 that extend outwardly from the ring hub 306. The adjacent teeth 308 form a stator slot 112 into which one or more stator windings may be disposed. That is, each slot can have a single stator winding 310 disposed therein or it can include two or more windings as shown in FIG. 3 and further examples below.

Figure 5:
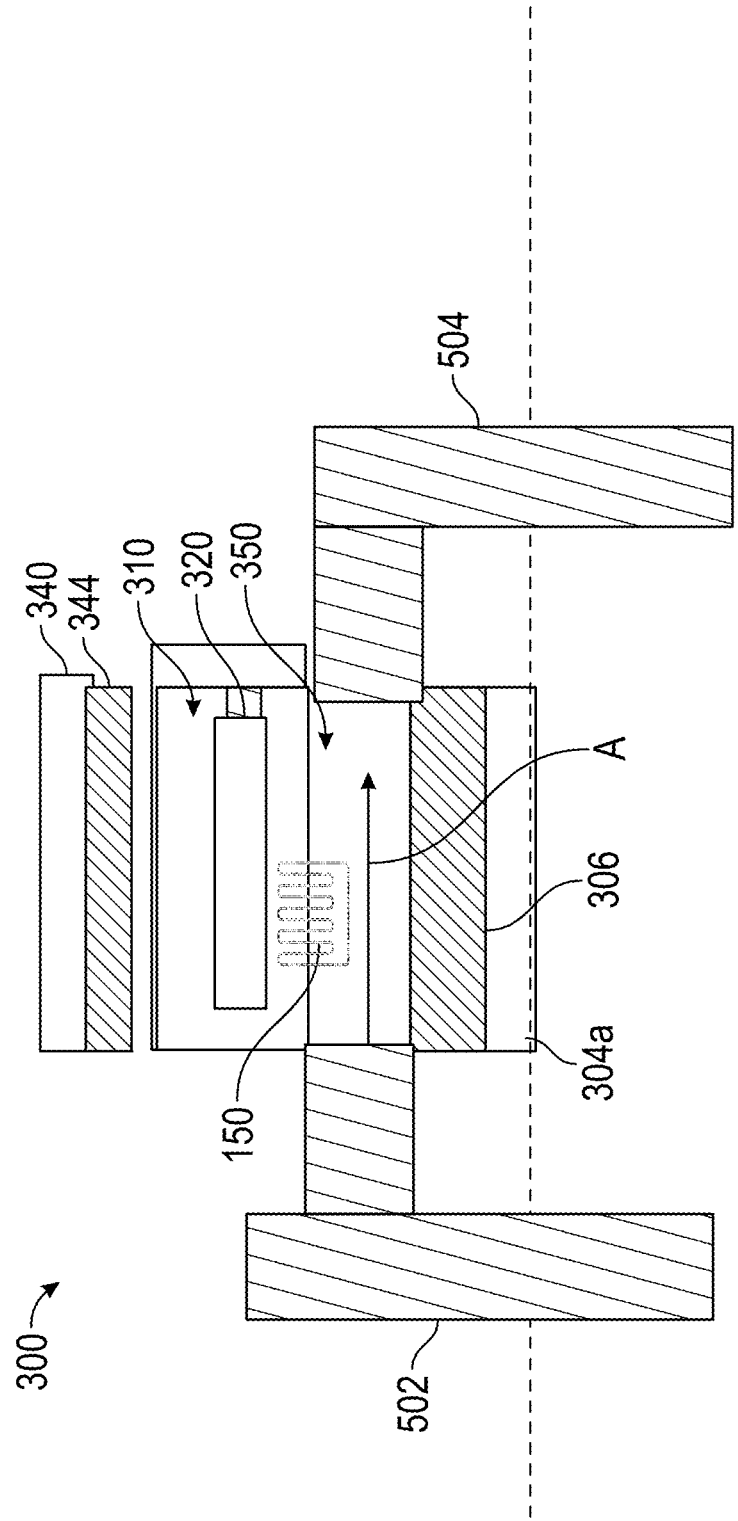
FIG. 5 shows parts of motor arranged relative to a header that delivers coolant to and from the motor.

The windings 310 can be arranged such that a cooling channel 350 is formed between an ID of the windings and a base 112a of the slot 112 that where the windings reside. In one embodiment, the cooling channel 350 is provided a cooling flow from one or more headers as illustrated in FIG. 5. Of course, the cooling channel could be air cooled. It shall be understood that the back iron 320 can help to maintain the windings 310 a desired distance from the base 112a to establish the channel 350.

Herein, the condenser section 150a can be disposed in the channel 350 and the evaporator section 150c disposed in the winding 310.

FIG. 5 illustrates a simple cross section through one segment 304a of the motor 300 to illustrate how fluid can be passed though the channel 350. As illustrated a coolant delivery system that includes an inlet header 502 and an outlet header 504 is arranged relative to the segment 304a so that it can provide fluid into the channel 350 and remove it from the channel. The fluid passes, in this example, in the direction indicated by arrow A. Such a configuration can result in flow continuity and reduced pressure drop.

In FIG. 5, the OHP 150 is shown in the same configuration as in FIG. 4 with the condenser section 150a being disposed in the channel 350 and the evaporator section 150c disposed in the coil.

As illustrated in FIG. 3, each outer winding 310b is separated from each other by optional phase separators 325 (separators for short herein). These separators can be any separator as described herein. An insulator 330 is disposed between each of the inner windings 310a.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A stator comprising:
   a stator hub;
   a plurality of stator teeth extending from the stator hub that define a stator slot having a stator slot base;
   at least one winding disposed in the stator slot; and
   one or more oscillating heat pipes disposed at least partially in the at least one winding;
   wherein the at least one winding is held apart from the stator slot base so that a cooling channel is defined between an inner winding portion of the at least one winding and the stator slot base and a portion of the one or more oscillating heat pipes is disposed in the channel so cooling fluid can be passed between the stator slot base and the inner winding portion to cool the inner winding portion via at least operation of the one or more oscillating heat pipes;
   where the stator is subject to a low frequency vibration in the range of 0.5-4000 hz.

2. The stator of claim 1, wherein the winding is encased in a potting material.

3. The stator of claim 2, wherein the winding is formed of Litz wire.

4. The stator of claim 1, further comprising insulators disposed between adjacent inner winding portions.

5. The stator of claim 1, wherein the at least one winding includes 3, 5 or 3n windings where n is a whole number.

6. The stator of claim 1, in combination with an inlet header and outlet header that collectively provide fluid through the channel.

7. The stator of claim 1, wherein the one or more oscillating heat pipes includes an evaporator section and a condenser section and wherein the evaporator section is disposed in the at least one winding and the condenser section is disposed in the cooling channel.

8. The stator of claim 1, where a longitudinal axis of the one or more oscillating heat pipes is aligned with a primary direction of vibration of the stator.

9. The stator of claim 1, wherein the one or more oscillating heat pipes includes an evaporator section and a condenser section and wherein the evaporator section is disposed in the at least one winding and the condenser section is disposed in the cooling channel.

10. A method of cooling a stator as recited in claim 1, the method comprising:
    operating a motor that includes the stator to cause the one or more oscillating heat pipes to vibrate along a longitudinal direction of the one or more oscillating heat pipes;
    providing fluid into the coolant channel from an inlet header; and removing fluid from the coolant channel via an outlet header;

where during operation, the stator is subject to a low frequency vibration in the range of 0.5-4000 Hz along the longitudinal direction.

11. A motor comprising:

a rotor; and a stator that includes:

a stator hub;

a plurality of stator teeth extending from the stator hub that define a stator slot having a stator slot base;

at least one winding disposed in the stator slot; and one or more oscillating heat pipes disposed at least partially in the at least one winding;

wherein the at least one winding is held apart from the stator slot base so that a cooling channel is defined between an inner winding portion of the at least one winding and the stator slot base and a portion of the one or more oscillating heat pipes is disposed in the channel so cooling fluid can be passed between the stator slot base and the inner winding portion to cool the inner winding portion via at least operation of the one or more oscillating heat pipes;

wherein the stator is subject to a low frequency vibration in the range of 0.5-4000 Hz while the motor is operating.

12. The motor of claim 11, wherein a longitudinal axis of the one or more oscillating heat pipes is aligned with a primary direction of vibration of the stator.

13. The motor of claim 11, wherein the winding is encased in a potting material.

14. The motor of claim 11, wherein the winding is formed of Litz wire.

15. The motor of claim 11, further comprising insulators disposed between adjacent inner winding portions.

16. The motor of claim 11, wherein the at least one winding includes 3, 5 or 3n windings where n is a whole number.

17. The motor of claim 11, further comprising:

an inlet header and outlet header that collectively provide fluid through the channel.

* * * * *